(12) United States Patent
Wu et al.

(10) Patent No.: US 11,461,929 B2
(45) Date of Patent: Oct. 4, 2022

(54) SYSTEMS AND METHODS FOR AUTOMATED CALIBRATION

(71) Applicant: SHANGHAI UNITED IMAGING INTELLIGENCE CO., LTD., Shanghai (CN)

(72) Inventors: Ziyan Wu, Cambridge, MA (US); Srikrishna Karanam, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 229 days.

(21) Appl. No.: 16/699,059

(22) Filed: Nov. 28, 2019

(65) Prior Publication Data

US 2021/0166427 A1 Jun. 3, 2021

(51) Int. Cl.
G06T 7/80 (2017.01)
G06T 7/00 (2017.01)

(52) U.S. Cl.
CPC ............. G06T 7/80 (2017.01); G06T 7/001 (2013.01); G06T 7/97 (2017.01)

(58) Field of Classification Search
CPC ...................................................... G06T 7/73
See application file for complete search history.

(56) References Cited

U.S. PATENT DOCUMENTS 10,399,227 B1 * 9/2019 Islam ..................... B25J 9/1697
10,635,844 B1 * 4/2020 Roose ...................... G06T 7/75
2007/0106306 A1 5/2007 Bodduluri et al.
2008/0240513 A1 10/2008 Xie et al.
2010/0272318 A1 * 10/2010 Cabiri ................. A61B 5/7264 382/106
2016/0264262 A1 * 9/2016 Colin ...................... G01N 29/04
2018/0242920 A1 * 8/2018 Hresko .............. G06K 9/00718

FOREIGN PATENT DOCUMENTS

CN 106294458 A 1/2017
CN 106667512 A 5/2017
CN 108310680 A 4/2018
(Continued)

OTHER PUBLICATIONS

International Search Report in PCT/CN2020/130164 dated Mar. 10, 2021, 5 pages.
(Continued)

*Primary Examiner* — Jayanti K Patel
*Assistant Examiner* — Christopher Kingsbury Glover
(74) *Attorney, Agent, or Firm* — Metis IP LLC

(57) ABSTRACT

A method for automated calibration is provided. The method may include obtaining a plurality of interest points based on prior information regarding a device and image data of the device captured by a visual sensor. The method may include identifying at least a portion of the plurality of interest points from the image data of the device. The method may also include determining a transformation relationship between a first coordinate system and a second coordinate system based on information of at least a portion of the identified interest points in the first coordinate system and in the second coordinate system that is applied to the visual sensor or the image data of the device.

16 Claims, 7 Drawing Sheets

(56) References Cited

FOREIGN PATENT DOCUMENTS

| | | |
|---|---|---|
| CN | 110251209 A | 9/2019 |
| CN | 110559077 A | 12/2019 |
| CN | 111145259 A | 5/2020 |
| EP | 2769689 A1 | 6/2014 |
| EP | 2769689 A1 * | 8/2014 ............. A61B 34/20 |

OTHER PUBLICATIONS

Written Opinion in PCT/CN2020/130164 dated Feb. 24, 2021, 5 pages.

* cited by examiner

SYSTEMS AND METHODS FOR AUTOMATED CALIBRATION

TECHNICAL FIELD

The present disclosure generally relates to systems and methods for imaging, and in particular, to systems and methods for automated calibration of a spatial relationship between different devices.

BACKGROUND

Calibration a spatial relationship between a visual sensor and an imaging or treatment device (e.g., a scanner), is a crucial step during an industrial and/or medical diagnosis and/or treatment procedure (e.g., radiation therapy planning, surgery planning). Generally, the spatial relationship between a visual sensor and a medical device may be calibrated using one or more calibration apparatuses and/or based on markers on the medical device or a table the subject is supported on. However, such calibration apparatuses or markers may be expensive to manufacture and/or maintain. In addition, a calibration process involving a calibration apparatus usually involves a complex procedure with, e.g., tedious manual operations. Therefore, it is desirable to provide systems and methods for effective and automated calibration of a spatial relationship between devices involved in a diagnosis and/or treatment procedure.

SUMMARY

In one aspect of the present disclosure, a system is provided. The system may include at least one storage device and at least one processor. The storing device may include executable instructions for automated calibration. When executing the executable instructions, the at least one processor may be configured to cause the system to obtain a plurality of interest points based on prior information regarding a device. Each of the plurality of interest points may correspond to a portion of the device. The prior information may provide one or more characteristics of each of a plurality of portions of the device in a first coordinate system applied to the device. The at least one processor may be configured to direct the system to obtain image data of the device captured by a visual sensor, the image data of the device including a representation of at feast a portion of the device. The at least one processor may be configured to direct the system to identify at least a portion of the plurality of interest points from the image data of the device. The at least one processor may be configured to direct the system to determine a transformation relationship between the first coordinate system and the second coordinate system based on information of at least a portion of the identified interest points in the first coordinate system and in a second coordinate system that is applied to the visual sensor or the image data of the device. The at least one processor may be configured to direct the system to determine one or more characteristics of at least a portion of the subject in the first coordinate system using the transformation relationship based on image data of a subject collected by the visual sensor.

In some embodiments, the prior information regarding the device may include an engineering drawing of the device or a layout of a room where the device is located.

In some embodiments, to obtain a plurality of interest points based on prior information regarding a device, the at least one processor may be further configured to cause the system to obtain the plurality of interest points from a feature library constructed based on the prior information regarding the device.

In some embodiments, the feature library may be constructed by a process including selecting, based on one or more criteria, a plurality of reference points on the device from the prior information; determining, based on the prior information, one or more reference feature descriptions of one or more reference features of each of the plurality of reference points; and establishing the feature library including the plurality of reference points and the one or more reference feature descriptions of each of the plurality of reference points.

In some embodiments, before obtaining the plurality of interest points from the feature library, the at least one processor may be further configured to cause the system to determine whether an actual setup of the device deviates from the prior information regarding the device. In response to a determination that the actual setup of the device deviates from the prior information regarding the device, the at least one processor may be further configured to cause the system to update the feature library.

In some embodiments, the at least one processor may be further configured to cause the system to obtain a plurality of second interest points from the feature library. The at least one processor may be further configured to cause the system to obtain second image data captured by a second sensor, the second image data including a representation of at least a portion of the device. The at least one processor may be further configured to cause the system to identify at least a portion of the plurality of second interest points from the second image data. The at least one processor may be further configured to cause the system to determine a second transformation relationship between the first coordinate system and a third coordinate system applied to the second visual sensor or the second image data based on identified second interest points. The at least one processor may be further configured to cause the system to determine one or more characteristics of at least a portion of the subject in the first coordinate system using the second transformation relationship based on second image data of the subject collected by the second visual sensor.

In some embodiments, to identify at least a portion of the plurality of interest points from the image data, the at least one processor may be further configured to cause the system to extract a plurality of feature points from the image data, each of the plurality of extracted feature points including one or more estimated feature descriptions of the extracted feature point. The at least one processor may be further configured to cause the system to obtain one or more reference feature descriptions of each of the plurality of interest points based on the prior information. The at least one processor may be further configured to cause the system to determine the at least a portion of the plurality of interest points by matching each of the at least a portion of the plurality of interest points with one of the plurality of feature points based on the one or more reference feature descriptions and the one or more estimated feature descriptions.

In some embodiments, to determine, based on information of at least a portion of the identified interest points in the first coordinate system and in a second coordinate system that is applied to the visual sensor or the image data of the device, a transformation relationship between the first coordinate system and the second coordinate system, the at least one processor may be further configured to cause the system to obtain a determination result by determining whether a prior transformation relationship determined in a prior update needs to be updated. The at least one processor may be further configured to cause the system to determine the transformation relationship based on the determination result.

In some embodiments, the determination result may include that the prior transformation relationship does not need to be updated. The determining the transformation relationship based on the determination result may include designating the prior transformation relationship as the transformation relationship.

In some embodiments, the determination result may include that the prior transformation relationship needs to be updated. The determining the transformation relationship based on the determination result may include generating the transformation relationship based on the information of the at least a portion of the identified interest points in the first coordinate system and the second coordinate system.

In some embodiments, to obtain a determination result by determining whether a prior transformation relationship needs to be updated, the at least one processor may be further configured to cause the system to determine whether the prior transformation relationship needs to be updated based on at least a portion of the identified interest points.

In some embodiments, to determine whether the prior transformation relationship needs to be updated based on at least a portion of the identified interest points, the at least one processor may be further configured to cause the system to determine a first location of each of the at least a portion of the identified interest points in the second coordinate system. The at least one processor may be further configured to cause the system to obtain a first transformed location in the first coordinate system by transforming the first location of each of the at least a portion of the identified interest points in the second coordinate system into the first coordinate system using the prior transformation relationship. The at least one processor may be further configured to cause the system to determine whether the prior transformation relationship needs to be updated based on a comparison between a first reference location of each of the at least a portion of the identified interest points in the first coordinate system and the corresponding first transformed location.

In some embodiments, to determine whether the prior transformation relationship needs to be updated based on a comparison between a reference location of each of at least a portion of the identified interest points in the first coordinate system and the first transformed location, the at least one processor may be further configured to cause the system to determine a deviation between the first reference location and the first transformed location in the first coordinate system of each of the at least a portion of the identified interest points. The at least one processor may be further configured to cause the system to determine that the prior transformation relationship needs to be updated in response to a determination that the deviation between the first reference location and the first transformed location of each of the at least a portion of the identified interest points exceeds a first threshold.

In some embodiments, to determine whether the prior transformation relationship needs to be updated based on at least a portion of the identified interest points, the at least one processor may be further configured to cause the system to determine a second location of each of the at least a portion of the identified interest points in the first coordinate system. The at least one processor may be further configured to cause the system to obtain a second transformed location in the second coordinate system by transforming the second location of each of the at least a portion of the identified interest points in the first coordinate system into the second coordinate system using the prior transformation relationship. The at least one processor may be further configured to cause the system to determine whether the prior transformation relationship needs to be updated based on a comparison between a second reference location of each of the at least a portion of the identified interest points in the second coordinate system and the corresponding second transformed location.

In some embodiments, to determine whether a prior transformation relationship needs to be updated, the at least one processor may be further configured to cause the system to determine whether the prior transformation relationship needs to be updated based on a deviation between a current position of the device and a prior position of the device when the prior update was performed or a deviation between a current position of the visual sensor and a prior position of the visual sensor when the prior update was performed.

In another aspect of the present disclosure, a method is provided. The method may be implemented on a computing device having at least one processor and at least one storage medium including a set of instructions. The method may include obtaining a plurality of interest points based on prior information regarding a device. Each of the plurality of interest points may correspond to a portion of the device. The prior information may provide one or more characteristics of each of a plurality of portions of the device in a first coordinate system applied to the device. The method may further include obtaining image data of the device captured by a visual sensor, the image data of the device including a representation of at least a portion of the device. The method may further include identifying at least a portion of the plurality of interest points from the image data of the device. The method may further include determining a transformation relationship between the first coordinate system and the second coordinate system based on information of at least a portion of the identified interest points in the first coordinate system and in a second coordinate system that is applied to the visual sensor or the image data of the device. The method may further include determining one or more characteristics of at least a portion of the subject in the first coordinate system using the transformation relationship based on image data of a subject collected by the visual sensor.

In yet another aspect of the present disclosure, a non-transitory computer-readable storage medium is provided. The non-transitory computer-readable storage medium may embody a computer program product. The computer program product may include instructions configured to cause a computing device to perform a method. The method may include obtaining a plurality of interest points based on prior information regarding a device. Each of the plurality of interest points may correspond to a portion of the device. The prior information may provide one or more characteristics of each of a plurality of portions of the device in a first coordinate system applied to the device. The method may further include obtaining image data of the device captured by a visual sensor, the image data of the device including a representation of at least a portion of the device. The method may further include identifying at least a portion of the plurality of interest points from the image data of the device. The method may further include determining a transformation relationship between the first coordinate system and the second coordinate system based on information of at least a portion of the identified interest points in the first coordinate system and in a second coordinate system that is applied to the visual sensor or the image data of the device. The method may further include determining one or more characteristics of at least a portion of the subject in the first coordinate system using the transformation relationship based on image data of a subject collected by the visual sensor.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
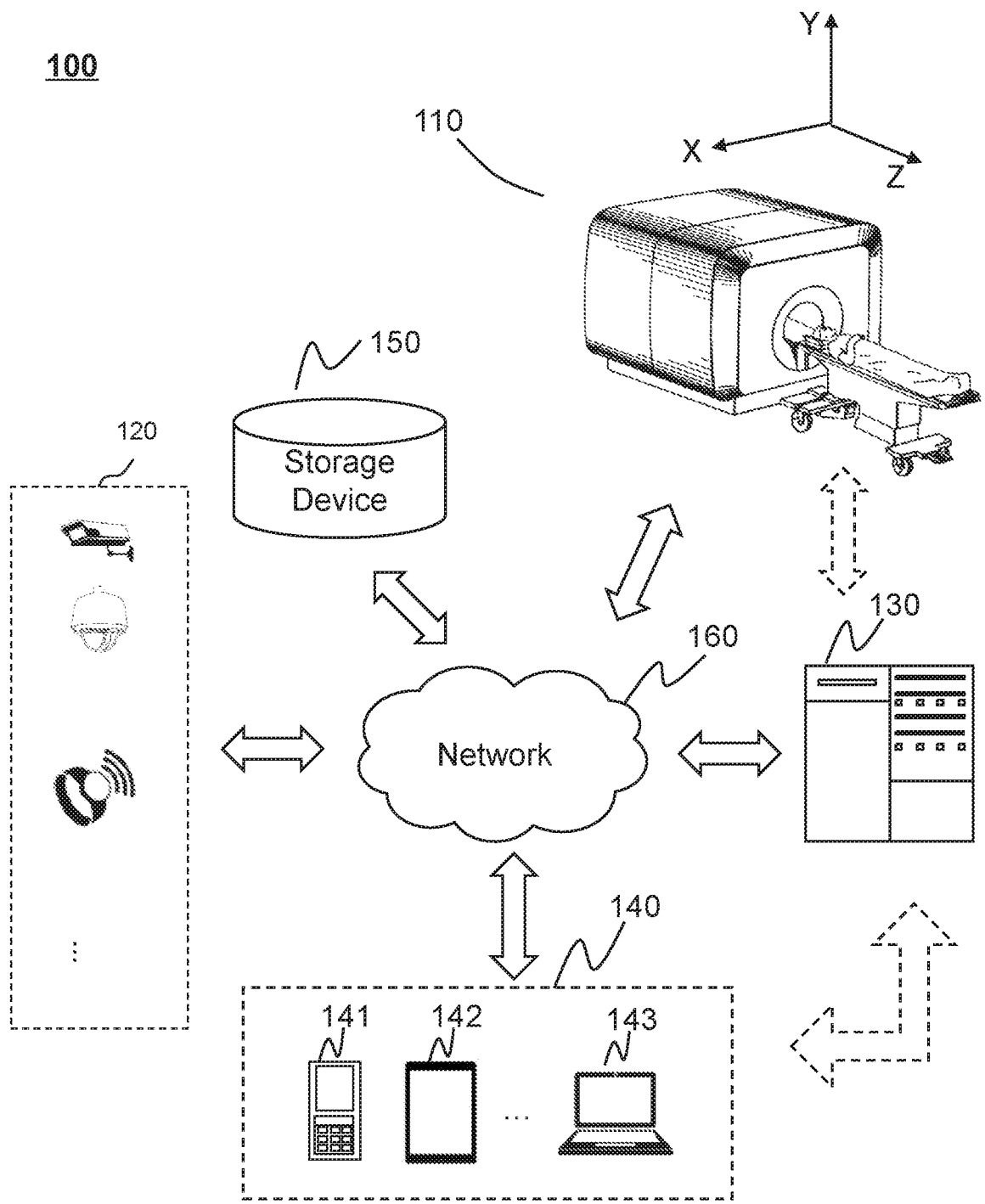
FIG. 1 is a schematic diagram illustrating an exemplary calibration system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) is for the purpose of illustration and description only and are not intended to limit the scope of the present disclosure. It is understood that the drawings are not to scale.

The flowcharts used in the present disclosure illustrate operations that systems implement according to some embodiments of the present disclosure. It s to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to methods and systems for automated calibration. The system may obtain, based on prior information regarding a device, a plurality of interest points. Each of the plurality of interest points may correspond to a position on the device or a portion of the device. The system may obtain image data captured by a sensor (e.g., a visual sensor). The image data may include a representation of at least a portion of the device. The system may also identify at least a portion of the plurality of interest points from the image data to obtain identified interest points by matching the image data and the prior information. The system may further determine, based on the identified interest points, a transformation relationship between a first coordinate system applied to the device and a second coordinate system applied to the sensor or the image data. The prior information regarding the device may provide structure information, appearance information, assembly information, etc., or a combination thereof, of the device and/or reference positions of different parts of the device in the second coordinate system. The system may determine the transformation relationship based on information (e.g., positions) of the identified interest points in the first coordinate system and the second coordinate system. Accordingly, the system may determine the transformation relationship between the first coordinate system and the second coordinate system automatically without using one or more calibration apparatuses and/or markers on the device or any other component, which may reduce the cost for manufacturing, maintaining, and/or operating the system, and improve the calibration efficiency.

In some embodiments, the system provided in the present disclosure may further determine a feature library based on the prior information regarding the device. The feature library may include a plurality of reference points each of which may include one or more reference feature descriptions extracted from the prior information and a reference location in the first coordinate system. For each of multiple sensors (e.g.; visual sensors) located around the device, the system may obtain the plurality of interest points from the feature library which may improve the calibration efficiency. The feature library may be updated based on a deviation between the actual setup of the device and the prior information regarding the device, which may improve the accuracy of the transformation relationship determined in the automated calibration.

In some embodiments, the system provided in the present disclosure may also determine, based on image data of a subject collected by a sensor (e.g., a visual sensor), one or more characteristics (e.g., a pose; a position, a size; shape, etc.) of at least a portion of the subject in the first coordinate system using the transformation relationship with improved accuracy, thereby improving the accuracy of the determined characteristics of the at least a portion of the subject in the first coordinate system and in turn the accuracy or efficacy of the diagnosis and/or treatment performed based thereon.

It should be noted that the calibration system 100 is described below with reference to a specific medical system and procedure merely for illustration purposes, and not intended to limit the scope of the present disclosure. The calibration system as described herein may be applied in other medical or industrial systems and procedures including, e.g., a system and procedure for non-invasive detection of internal artifact or defect. For persons having ordinary skills in the art, a certain amount of variations, changes, and/or modifications may be deducted under the guidance of the present disclosure. Those variations, changes, and/or modifications do not depart from the scope of the present disclosure.

FIG. 1 is a schematic diagram illustrating an exemplary calibration system 100 according to some embodiments of the present disclosure. In some embodiments, the calibration system 100 may be used in an intelligent transportation system (ITS), an autonomous driving system, a security system, a medical procedure system, or the like, or any combination thereof. The calibration system 100 may be a platform for data and/or information processing, for example, determining and/or updating a transformation relationship between a coordinate system applied to a visual sensor or image data collected by a visual sensor and another coordinate system applied to another device.

For the purposes of illustration, the calibration system 100 used in a medical procedure system (e.g., an imaging system, a treatment system, etc.) may be described. As illustrated in FIG. 1, the calibration system 100 used in the medical procedure system may include a medical device 110, an imaging device 120, a processing device 130, one or more terminal(s) 140, a storage device 150, and a network 160. In some embodiments, the medical device 110, the imaging device 120, the processing device 130, the terminal(s) 140, and/or the storage device 150 may be connected to and/or communicate with each other via a wireless connection (e.g., the network 160), a wired connection, or a combination thereof. The connections between the components in the calibration system 100 may vary. Merely by way of example, the imaging device 120 may be connected to the processing device 130 through the network 160, as illustrated in FIG. 1. As another example, the storage device 150 may be connected to the processing device 130 through the network 160, as illustrated in FIG. 1, or connected to the processing device 130 directly. As a further example, the terminal(s) 140 may be connected to the processing device 130 through the network 160, as illustrated in FIG. 1, or connected to the processing device 130 directly.

The medical device 110 may include any device used in a medical procedure. As used herein, a medical procedure may refer to an activity or a series of actions attended to achieve a result in the delivery of healthcare, for example, directed at or performed on a subject (e.g., a patient) to measure, diagnosis and/or treat the subject. Exemplary medical procedures may include a diagnostic procedure (e.g., an imaging procedure), a treatment procedure (e.g., a radiotherapy treatment procedure), etc. The subject may be biological or non-biological. For example, the subject may include a patient, a man-made object, etc. As another example, the subject may include a specific portion, organ, and/or tissue of the patient. For example, the subject may include the head, the neck, the thorax, the heart, the stomach, blood vessels, soft tissues, tumors, nodules, or the like, or a combination thereof.

In some embodiments, the medical device 110 may include an imaging device, a treatment device (e.g., a radiotherapy equipment), a multi-modality device to acquire one or more images of different modalities or acquire an image relating to at least one part of a subject and perform treatment on the at least one part of the subject, etc. The imaging device may be configured to generate an image including a representation of at least one part of the subject. Exemplary imaging devices may include, for example, a computed tomography (CT) device, a cone beam CT device, a positron emission computed tomography (PET) device, a volume CT device, a magnetic resonance imaging (MRI) device, or the like, or a combination thereof. The treatment device may be configured to perform a treatment on at least one part of the subject. Exemplary treatment devices may include a radiotherapy device (e.g., a linear accelerator), an X-ray treatment device, etc.

The imaging device 120 may be configured to obtain image data including a representation of at least a portion of the medical device 110. The image data may include a static image, a video, an image sequence including multiple static images, etc. The medical device 110 may be installed within the field of view of the imaging device 120. For example, the medical device 110 and the imaging device 120 may be located in the same room. As another example, the imaging device 120 may be mounted on the ceiling or a wall of the room where the medical device 100 is located. The imaging device 120 may include one or more visual sensors, etc. The visual sensors may refer to an apparatus for visual recording. The visual sensors may capture the image data including the representation of at least a portion of the medical device 110. In some embodiments, the visual sensors may be located at different positions. The medical device 110 may be located within the field view of each of at least a portion of the visual sensors. The visual sensors may capture image data representing different parts of the medical device 110 from different perspectives. In some embodiments, the visual sensors may include a stereo camera configured to capture a static image or video. The stereo camera may include a binocular vision device or a multi-camera. In some embodiments, the visual sensors may include a digital camera. The digital camera may include a 2D camera, a 3D camera, a panoramic camera, a VR (virtual reality) camera, a web camera, an instant picture camera, an infrared (IR) camera, an RGB sensor, an RGBD camera, a near-infrared (NIR) sensor, a far-infrared (FIR) sensor, a range sensor, or the like, or any combination thereof. In some embodiments, the imaging device 120 may transmit the collected image data to the processing device 130, the storage device 150 and/or the terminal(s) 140 via the network 160.

The processing device 130 may process data and/or information obtained from the medical device 110, the imaging device 120, the terminal(s) 140, the storage device 150, and/or the imaging device 120. In some embodiments, the processing device 130 may calibrate a transformation relationship between a first coordinate system applied to the medical device 110 and a second coordinate system applied to the image data or the imaging device 120. For example, the processing device 130 may obtain, based on prior information regarding the medical device 110, a plurality of interest points each of which includes a reference feature description of a feature in the first coordinate system. The processing device 130 may obtain image data captured by the imaging device 120, the image data including a representation of at least a portion of the device. The processing device 130 may identify at least a portion of the plurality of interest points from the image data to obtain identified interest points. The processing device 130 may determine, based on information associated with the identified interest points in the first coordinate system and the second coordinate system, the transformation relationship. In some embodiments, the processing device 130 may determine, based on image data of a subject collected by the visual sensor, at least one of a pose or a position of at least a portion of the subject in the first coordinate system using the transformation relationship. In some embodiments, the processing device 130 may be a single server or a server group. The server group may be centralized or distributed. In some embodiments, the processing device 130 may be local or remote. For example, the processing device 130 may access information and/or data from the medical device 110, the terminal(s) 140, the storage device 150, and/or the imaging device 120 via the network 160. As another example, the processing device 130 may be directly connected to the medical device 110, the imaging device 120, the terminal(s) 140, and/or the storage device 150 to access information and/or data. In some embodiments, the processing device 130 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 130 may be implemented by a mobile device 300 having one or more components as described in connection with FIG. 3.

The terminal(s) 140 may be connected to and/or communicate with the medical device 110, the processing device 130, the storage device 150, and/or the imaging device 120. For example, the terminal(s) 140 may obtain a processed image from the processing device 130. As another example, the terminal(s) 140 may obtain image data acquired via the imaging device 120 and transmit the image data to the processing device 130 to be processed. In some embodiments, the terminal(s) 140 may include a mobile device 141, a tablet computer 142, . . . , a laptop computer 143, or the like, or any combination thereof. For example, the mobile device 141 may include a mobile phone, a personal digital assistance (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye-tracking input, a brain monitoring system, or any other comparable input mechanism. The input information received through the input device may be transmitted to the processing device 130 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 130.

The storage device 150 may store data, instructions, and/or any other information. In some embodiments, the storage device 150 may store data obtained from the medical device 110, the terminal(s) 140, the processing device 130, and/or the imaging device 120. In some embodiments, the storage device 150 may store data and/or instructions that the processing device 130 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 160 to communicate with one or more other components in the calibration system 100 (e.g., the processing device 130, the terminal(s) 140, the visual sensor, etc.). One or more components in the calibration system 100 may access the data or instructions stored in the storage device 150 via the network 160. In some embodiments, the storage device 150 may be part of the processing device 130.

The network 160 may include any suitable network that can facilitate the exchange of information and/or data for the calibration system 100. In some embodiments, one or more components of the calibration system 100 (e.g., the medical device 110, the terminal(s) 140, the processing device 130, the storage device 150, the imaging device 120, etc.) may communicate information and/or data with one or more other components of the calibration system 100 via the network 160. For example, the processing device 130 may obtain image data from the visual sensor via the network 160. As another example, the processing device 130 may obtain user instruction(s) from the terminal(s) 140 via the network 160. The network 160 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, switches, server computers, and/or any combination thereof. For example, the network 160 may include a cable network, a wireline network, a fiber-optic network, a telecommunications network, an intranet, a wireless local area network (VVLAN), a metropolitan area network (MAN), a public telephone switched network (PSTN), a Bluetooth T" network, a ZigBee™ network, a near field communication (NFC) network, or the like, or any combination thereof. In some embodiments, the network 160 may include one or more network access points. For example, the network 160 may include wired and/or wireless network access points such as base stations and/or Internet exchange points through which one or more components of the calibration system 100 may be connected to the network 160 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 150 may be a data storage including cloud computing platforms, such as public cloud, private cloud, community, and hybrid clouds, etc. However, those variations and modifications do not depart the scope of the present disclosure.

Figure 2:
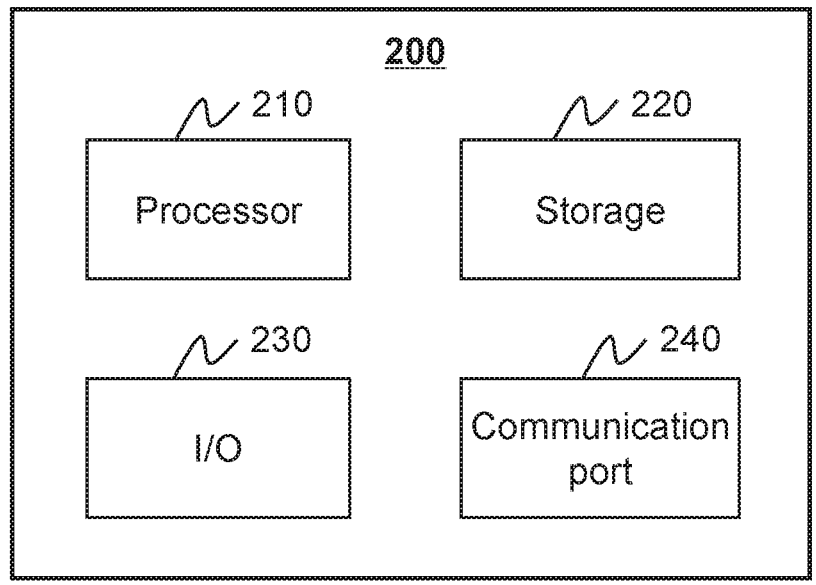
FIG. 2 is a schematic diagram illustrating hardware and/or software components of an exemplary computing device according to some embodiments of the present disclosure.

FIG. 2 is a schematic diagram illustrating hardware and/or software components of an exemplary computing device according to some embodiments of the present disclosure. As illustrated in FIG. 2, the computing device 200 may include a processor 210, a storage 220, an input/output (I/O) 230, and a communication port 240. In some embodiments, the processing device 130 and/or the terminal(s) 140 may be implemented on the computing device 200.

The processor 210 may execute computer instructions (program code) and, when executing the instructions, cause the processing device 130 to perform functions of the processing device 130 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the medical device 110, the terminal(s) 140, the storage device 150, the imaging device 120, and/or any other components of the calibration system 100. For example, the processor 210 may obtain image data from a visual sensor. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the medical device 110, the terminal(s) 140, the storage device 150, the imaging device 120, or any other components of the calibration system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program (e.g., in the form of computer-executable instructions) for the processing device 130 for determining a calibration model for calibration. As another example, the storage 220 may store a program (e.g., in the form of computer-executable instructions) for the processing device 130 to determine whether the calibration model needs to be updated.

The I/O 230 may input or output signals, data, and/or information. In some embodiments, the I/O 230 may enable user interaction with the processing device 130. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 160) to facilitate data communications. The communication port 240 may establish connections between the processing device 130 and the medical device 110, the terminal(s) 140, the storage device 150, or the imaging device 120. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
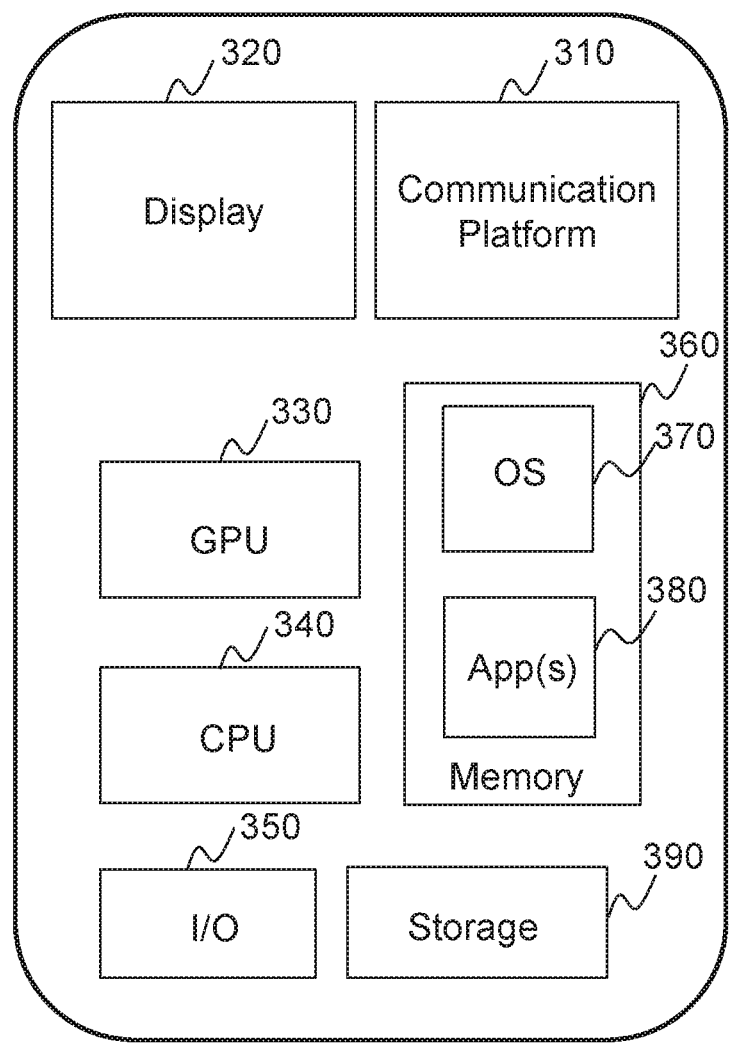
FIG. 3 is a schematic diagram illustrating hardware and/or software components of a mobile device according to some embodiments of the present disclosure.

FIG. 3 is a schematic diagram illustrating hardware and/or software components of a mobile device according to some embodiments of the present disclosure. In some embodiments, the processing device 130 and/or the terminal(s) 140 may be implemented on the computing device 200. As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 130. User interactions with the information stream may be achieved via the I/O 350 and provided to the processing device 130 and/or other components of the calibration system 100 via the network 160.

To implement various modules, units, and functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate a high-quality image of a scanned object as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
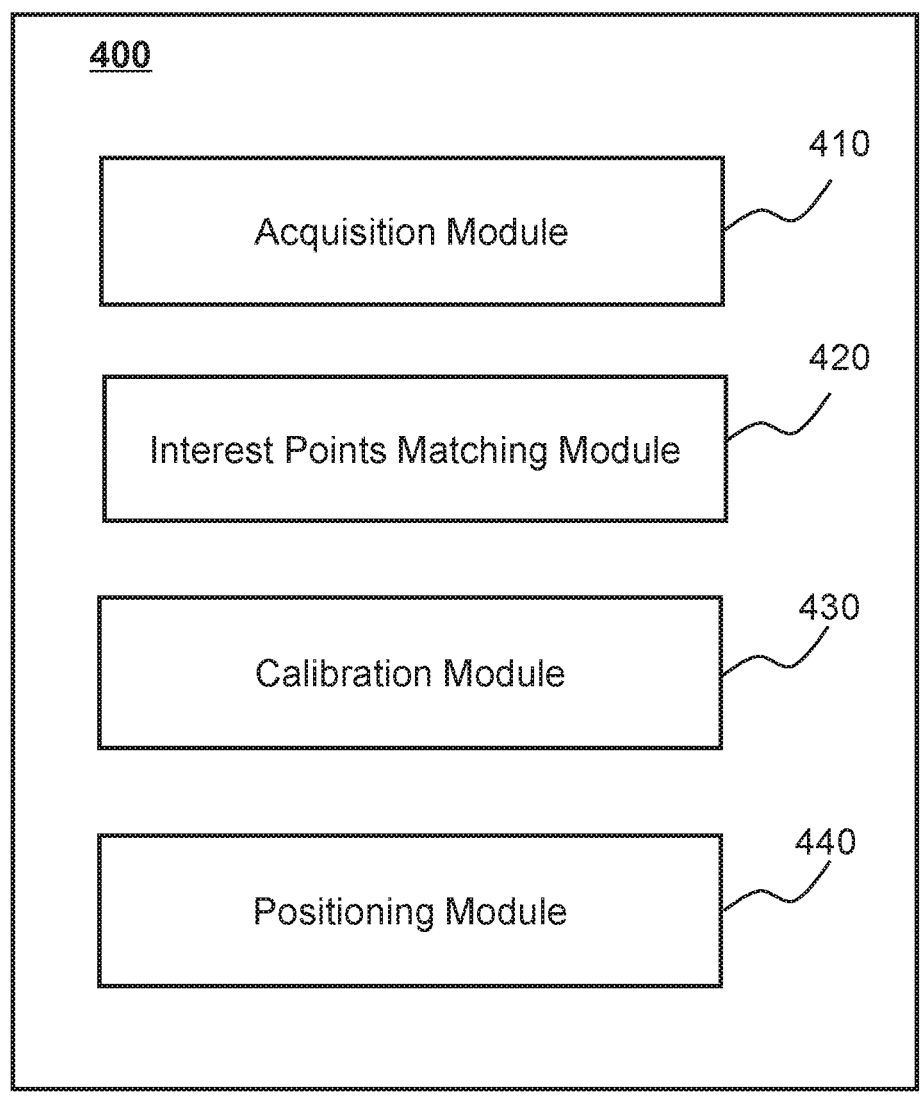
FIG. 4 is a block diagram illustrating an exemplary processing device according to some embodiments of the present disclosure.

FIG. 4 is a block diagram illustrating an exemplary processing device according to some embodiments of the present disclosure. In some embodiments, the processing device 400 (e.g., the processing device 130) may be implemented on a computing device 200 (e.g., the processor 210) illustrated in FIG. 2 or the CPU 340 as illustrated in FIG. 3. As illustrated in FIG. 4, the processing device 400 may include an acquisition module 410, an interest point matching module 404, a calibration module 406, and a positioning module 408. Each of the modules described above may be a hardware circuit that is designed to perform certain actions, e.g., according to a set of instructions stored in one or more storage media, and/or any combination of the hardware circuit and the one or more storage media.

The acquisition module 410 may obtain data/information from one or more components of the calibration system 100. For example, the acquisition module 410 may obtain, based on prior information regarding a device, a plurality of interest points and reference feature descriptions thereof. Each of the plurality of interest points may correspond to a position on the device. As another example, the acquisition module 410 may obtain the plurality of interest points and the reference feature descriptions thereof from a feature library constructed based on the prior information regarding the device. The feature library may be generated by a processing device the same as or different from the processing device 400 according to process 600. As still another example, the acquisition module 410 may obtain image data collected by the visual sensor. In some embodiments, the image data may include an image representing at least a portion of the device.

The interest points matching module 420 may identify at least a portion of the plurality of interest points from the image data. As used herein, the identification of an interest point from the image data may refer to determine a point from the image data that represents a position on the device or a portion of the device where the interest point corresponds to. The point determined from the image data that represents the position on the device or the portion of the device where the interest point corresponds to may match with the interest point.

In some embodiments, the interest points matching module 420 may identify the at least a portion of the plurality of interest points from the image data by matching the image data representing at least a portion of the device with the prior information (e.g., a CAD model) regarding the device. The interest points matching module 420 may match the image data and the prior information using an image matching technique. Exemplary image matching techniques may include using a blocking matching algorithm (e.g., a mean absolute differences (MAD) algorithm, a sum of absolute differences (SAD) algorithm, etc.), a feature-based matching algorithm, etc. For example, using the feature-based matching algorithm, the interest points matching module 420 may detect and/or extract a plurality of features points from the image data using a feature point extraction technique as described elsewhere in the present disclosure. Each of the plurality of feature points extracted from the image data may include one or more estimated feature descriptions. The one or more estimated feature descriptions of a feature point may be used to describe one or more features of the feature point, such as position, orientation, the distance between the feature point and another feature point or a reference point, etc., in the image data. In some embodiments, the one or more estimated feature descriptions may be denoted as an estimated feature vector. The interest points matching module 420 may identify an interest point from the image data by matching the interest point with one of the plurality of feature points. Further, the interest points matching module 420 may match the interest point with a feature point by matching the reference feature descriptions of the interest point and the estimated feature descriptions of the feature point.

The calibration module 430 may determining a current transformation relationship between the first coordinate system and the second coordinate system based on the identified interest points. The calibration module 430 may determine the current transformation relationship based on information associated with the identified interest points in the image data (or the second coordinate system) and information associated with the identified interest points in the prior information (or the first coordinate system). For example, the calibration module 430 may determine a location of each of at least a portion of the identified interest points in the second coordinate system applied to the image data or the visual sensor. The calibration module 430 may determine a location of each of at least a portion of the identified interest points in the first coordinate system. The calibration module 430 may determine the current transformation relationship based on the location of each of at least a portion of the identified interest points in the second coordinate system and the location of each of at least a portion of the identified interest points in the first coordinate system.

The positioning module 440 may determine, based on image data of a subject collected by the visual sensor, one or more characteristics of at least a portion of the subject in the first coordinate system using the transformation relationship. The one or more characteristics of at least a portion of the subject in the first coordinate system may include a spatial location, a size, a pose, a shape, etc., of the at least a portion of the subject.

In some embodiments, the processing device 400 may include a feature library determination module (not shown). The feature library determination module may extract a plurality of reference points from the prior information regarding the device based on one or more criteria. Each of the plurality of reference points may correspond to a portion of the device or a position on the device. The feature library determination module may update the feature library from time to time, e.g., periodically or not. For example, the feature library may be updated automatically periodically, such as once every one or more days, a week, a month, etc. As another example, the feature library may be updated in response to receipt of a request for an update from a user inputted via, e.g., the terminal(s) 140, or an event identified. In some embodiments, the feature library determination module may be integrated into the interest points matching module 420.

In some embodiments, the processing device 400 may include a judgement module (not shown). The judgement module may determine whether a prior transformation relationship between the first coordinate system of the device and the second coordinate system of the visual sensor and/or the feature library need to be updated. In some embodiments, the judgement module may determine whether the prior transformation relationship and/or the feature library need to be updated based on the time that has elapsed since the prior time when the prior transformation relationship was determined (or the last update was performed). If the time length exceeds a threshold, the judgement module may determine that the prior transformation relationship and/or the feature library need to be updated. In some embodiments, the judgement module may determine whether the prior transformation relationship and/or the feature library need to be updated based on the receipt of a request from a user. In some embodiments, the judgement module may determine whether the prior transformation relationship and/or the feature library need to be updated based on the detection of an event, e.g., by assessing whether a change has occurred in the system. In some embodiments, the judgement module may be integrated into the calibration module 430 and/or the interest points matching module 420.

In some embodiments, the processing device 400 may include a storage module (not shown) for storing information/data. The information may include programs, software, algorithms, calibration models (i.e., transform relationship), the feature library, or the like, or a combination thereof. In some embodiments, the storage module may store one or more programs and/or instructions that may be executed by the processing device 130 to perform exemplary methods described in this disclosure. For example, the storage module may store program(s) and/or instruction(s) that can be executed by the first computing apparatus 120 to acquire second training samples, obtain first trained machine learning models, obtain trained generator models, train a second machine learning model, and/or transmit a second trained machine learning model to the second computing apparatus(s).

Figure 5:
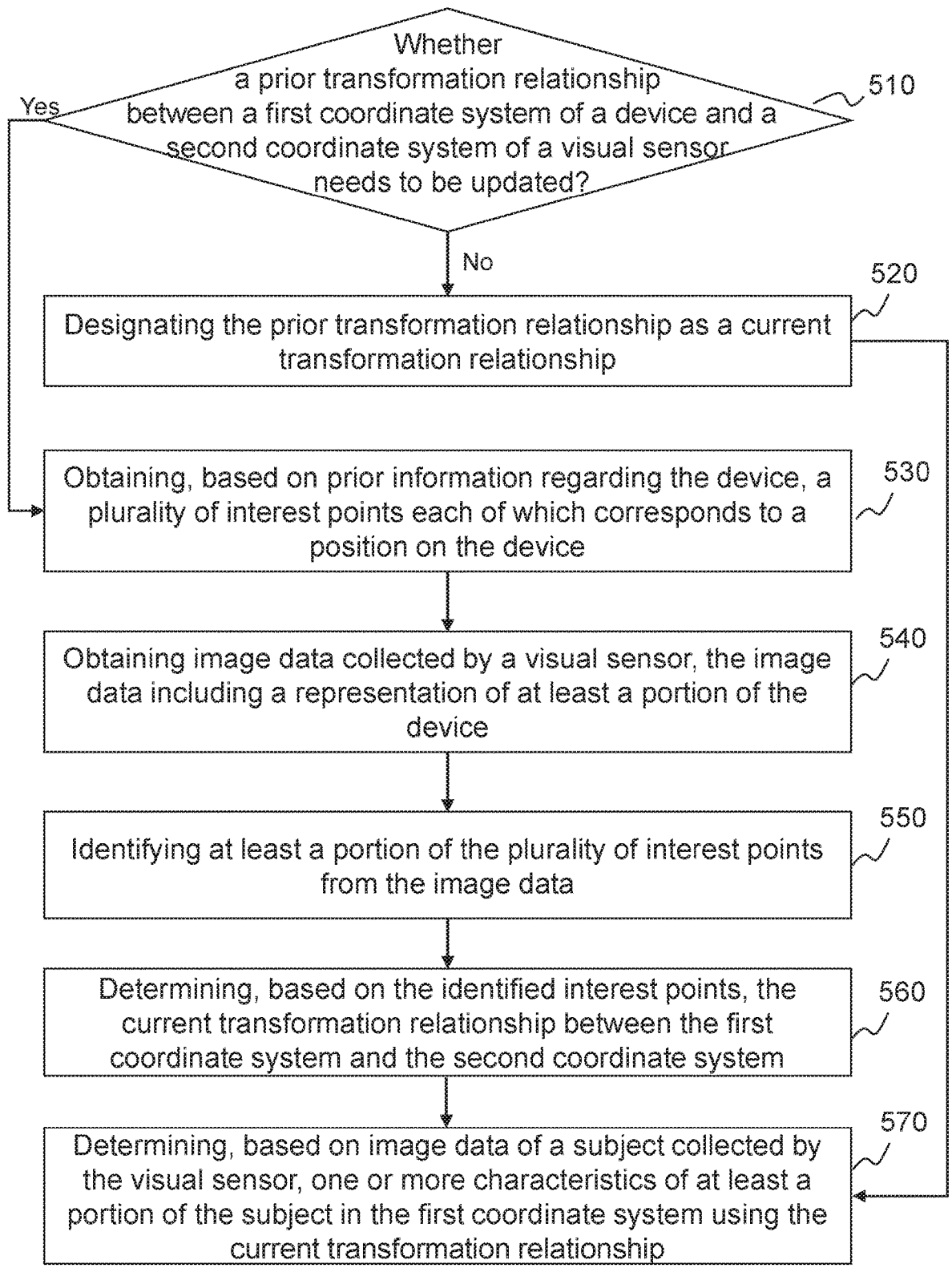
FIG. 5 is a flowchart illustrating an exemplary process of positioning a subject according to some embodiments of the present disclosure.

FIG. 5 is a flowchart illustrating an exemplary process of positioning a subject according to some embodiments of the present disclosure. Process 500 may be executed by the calibration system 100. For example, process 500 may be implemented as a set of instructions (e.g., an application) stored in the storage device 150 in the calibration system 100. The processing device 130 may execute the set of instructions and may accordingly be directed to perform process 500 in the calibration system 100. The operations of the illustrated process 500 presented below are intended to be illustrative. In some embodiments, process 500 may be accomplished with one or more additional operations not described, and/or without one or more of the operations discussed. Additionally, the order in which the operations of process 500 as illustrated in FIG. 5 and described below is not intended to be limiting.

In 510, the processing device 130 (e.g., the calibration module 430 and/or the judgement module) may determine whether a prior transformation relationship between a first coordinate system of a device and a second coordinate system of a visual sensor needs to be updated. At least a portion of the device (e.g., the medical device 110) may be located within the field of view of the visual sensor (e.g., the imaging device 120). In some embodiments, the device and the visual sensor may be located in the same environment. For example, the device and the visual sensor may be located in the same room (e.g., a scanner room). As another example, the visual sensor may be installed outside the room but at least part of the device may be located within the field of view of the visual sensor (e.g., the imaging device 120). More descriptions for the device and/or the visual sensor may be found elsewhere in the present disclosure.

As used herein, a transformation relationship between the first coordinate system of the device and the second coordinate system of the visual sensor may refer to a spatial relationship between a point in the first coordinate system applied to the device (e.g., the medical device 110) and the point in the second coordinate system applied to the visual sensor (e.g., the imaging device 120) or image data collected by the visual sensor. In some embodiments, the second coordinate system may include a three-dimensional (3D) coordinate system (i.e., a sensor coordinate system) applied to the visual sensor, and the transformation relationship may include a first transformation relationship between the first coordinate system applied to the device and the second coordinate system applied to the visual sensor. In some embodiments, the second coordinate system may include a 3D or a two-dimensional (2D) coordinate system (i.e., an image coordinate system) applied to the image data captured by the visual sensor, and the transformation relationship may include a second transformation relationship between the first coordinate system applied to the device and the second coordinate system applied to image data collected by the visual sensor. The transformation relationship may be defined by calibration parameters of the visual sensor. The calibration parameters of the visual sensor may include intrinsic parameters, extrinsic parameters, distortion parameters, etc. For example, the first transformation relationship may be defined by one or more extrinsic parameters of the visual sensor. The second transformation relationship may be defined by one or more extrinsic parameters, one or more intrinsic parameters, and distortion parameters, etc., of the visual sensor. The intrinsic parameters of the visual sensor may include a camera focal length, an optical center, etc. The extrinsic parameters of the visual sensor may include a tilt angle of the visual sensor, a yaw angle of the visual sensor, a height of the visual sensor from a reference plane (e.g., the horizontal plane), etc. The distortion parameters of the visual sensor may include a radial distortion coefficient, a tangential distortion coefficient, etc.

The first coordinate system applied to the device (e.g., the medical device 110 may include a three-dimensional coordinate system that is used to denote positions of different portions of the device or other subjects around the device in the real world. The second coordinate system applied to image data that is captured by the visual sensor may include an image physical coordinate system, a pixel coordinate system, etc. The second coordinate system applied to the visual sensor may include a three-dimensional coordinate system with an optical center of the visual sensor as a coordinate origin. The first coordinate system and/or the second coordinate system may be part of a default setting of the calibration system 100. For example, the first coordinate system may have a coordinate origin of an isocenter of the medical device 110 (e.g., a CT device), a radiation source of the medical device 110, or any suitable position in the environment accommodating the medical device 110. As another example, the second coordinate system may have a coordinate origin of a center of an image collected by the visual sensor. As still another example, the second coordinate system may use an optical axis of the visual sensor as the Z-axis. The X-axis and Y-axis of the second coordinate system may define a projection plane of the visual sensor.

As used herein, the update of the transformation relationship may refer to the update of the values of calibration parameters of the visual sensor. The prior transformation relationship may include prior values of the calibration parameters of the visual sensor determined in a prior update (or calibration), for example, in the last update (or calibration) of the transformation relationship. The update of the prior transformation relationship may include updating the prior values of the calibration parameters of the visual sensor determined in the prior update (or calibration). In some embodiments, the transformation relationship may be updated from time to time, e.g., periodically or not. For example, the transformation relationship may be updated automatically periodically, such as once every one or more days, a week, a month, etc. As another example, the transformation relationship may be updated in response to receipt of a request for calibration from a user inputted via, e.g., the terminal(s) 140, or an event identified. In some embodiments, the processing device 130 may determine whether the prior transformation relationship needs to be updated based on the time that has elapsed since the prior time when the prior transformation relationship was determined (or the last update was performed). If the time length exceeds a threshold, the processing device 130 may determine that the prior transformation relationship needs to be updated. In some embodiments, the processing device 130 may determine whether the prior transformation relationship needs to be updated based on the receipt of a request for calibration from a user.

In some embodiments, the processing device 130 may determine whether the prior transformation relationship needs to be updated based on the detection of an event, e.g., by assessing whether a change has occurred in the system. For instance, the processing device 130 may determine whether the prior transformation relationship needs to be updated based on a deviation between a current position of the device (e.g., the medical device 110) and a prior position of the device (e.g., the medical device 110) when the last update was performed (i.e., the prior transformation relationship was determined) or a deviation between a current position of the visual sensor and a prior position of the visual sensor when the last update was performed. If the processing device 130 determines that the deviation exceeds a threshold, the processing device 130 may determine that the prior transformation relationship needs to be updated. If the processing device 130 determines that the deviation is less than the threshold, the processing device 130 may determine that the prior transformation relationship does not need to be updated. In some embodiments, the processing device 130 may detect the deviation between the current position of the device (e.g., the medical device 110) and the prior position of the device (e.g., the medical device 110) and/or the deviation between the current position of the visual sensor and the prior position of the visual sensor based on a position sensor, a distance measurement equipment, etc. In some embodiments, the processing device 130 may detect the deviation between the current position of the device (e.g., the medical device 110) and the prior position of the device (e.g., the medical device 110) when the last update was performed and/or the deviation between the current position of the visual sensor and the prior position of the visual sensor based on the prior transformation relationship. More descriptions regarding the determination of whether a prior transformation relationship needs to be updated may be found elsewhere in the present disclosure. See, e.g., FIG. 7 and relevant descriptions thereof.

In response to a determination that the prior calibration model does not need to be updated, the process 500 may proceed to perform operation 520. In operation 520, the processing device 130 may designate the prior transformation relationship as a current transformation relationship. The current transformation relationship may be used to determine a pose and/or position of at least a portion of a subject in the first coordinate system based on image data representing the at least a portion of the subject collected by the visual sensor as described in operation 570. In response to a determination that the prior transformation relationship needs to be updated, the process 500 may proceed to perform operations 530-560 for updating the prior transformation relationship.

In 530, the processing device 130 (e.g., the acquisition module 410) may obtain, based on prior information regarding the device, a plurality of interest points each of which corresponds to a position on the device.

The prior information regarding the device may include one or more images providing structure information, appearance information, assembly information, etc., of the device and/or reference locations of different parts of the device in the second coordinate system. The prior information regarding the device may provide one or more characteristics or information (e.g., sizes, shapes, positions in the device, position relationships, etc.) associated with different components of the device in the first coordinate system applied to the device. In some embodiments, the prior information regarding the device may include engineering data of the device and/or engineering data associated with a room or space where the device is located. The engineering data associated with the device may include an engineering drawing of the device. The engineering drawing of the device may include a computer-aided design (CAD) model, a design drawing, etc. The CAD model may be a three-dimension (3D) model or a two-dimension (2D) model. The engineering data associated with the room may include an engineering drawing of the room, such as a drawing of a room layout, a floorplan drawing, etc. The engineering data associated with the device may include position information of different parts of the device mounted in the room. The prior information regarding the device may be obtained from storage (e.g., the storage device 150, the storage 220, etc.), or any other data source. For example, any other data source may include a website, a database, a system, etc. As another example, the processing device 130 may obtain the prior information regarding the device from a supplier and/or a manufacturer website of the device.

Each of the plurality of interest points may correspond to a position on the device or a portion of the device. A position on the device or a portion of the device may be represented in the prior information (e.g., the design drawing) as a point. An interest point may be also referred to as a feature point or key-point. For example, the interest point may include a corner point, a boundary point, a dark point in a bright region, a bright point in a dark region, or the like, or any combination thereof. Each of the plurality of interest points may include one or more reference feature descriptions extracted from the prior information regarding the device. In some embodiments, the one or more reference feature descriptions may be denoted as a reference feature vector. The one or more reference feature descriptions of an interest point may be used to describe one or more features of the interest point, such as position, orientation, the distance between the interest point and another interest point or a reference point, etc., in the prior information. In some embodiments, the plurality of interest points and the one or more reference feature descriptions thereof may be detected and/or extracted from the prior information regarding the device using a feature point extraction technique. Exemplary feature point extraction techniques may include using a local binary patterns (LBP) algorithm, a histogram of oriented gradient (HOG) algorithm, a Harris feature extraction algorithm, a scale-invariant feature transform (SIFT) algorithm, a smallest univalue segment assimilating nucleus (SUSAN) algorithm, a features from accelerated segment test (FAST) algorithm, a random sample consensus (RANSAC) algorithm, a binary robust independent elementary features (BRIEF) extraction algorithm, a speeded-up robust (SURF) algorithm, an oriented FAST and rotated BRIEF (ORB) algorithm, etc. In some embodiments, using the feature point extraction technique, the plurality of interest points may be extracted from the prior information according to one or more criteria, such as viewpoint invariant, rotation invariant, scale invariant, affine invariant, projected invariant, overall uniqueness, etc. For example, the SIFT algorithm may be used to detect and/or extract the plurality of interest points from the prior information of the device according to the scale invariant. As another example, the Harris feature extraction algorithm may be used to detect and/or extract the plurality of interest points from the prior information of the device according to the rotation invariant. As still another example, the SUSAN algorithm may be used to detect and/or extract the plurality of interest points from the prior information of the device according to the scale invariant and the viewpoint invariant. As used herein, the overall uniqueness of an interest point may refer to that the interest point may be unique enough to provide location information of at least a portion of the device. The overall uniqueness may be also referred to as distinctiveness.

In some embodiments, the plurality of interest points and the reference feature descriptions thereof may be obtained from a feature library constructed based on the prior information regarding the device. The feature library may be generated by a processing device the same as or different from the processing device 130 according to process 600. See FIG. 6 and descriptions thereof. The feature library may include a plurality of reference points and reference feature descriptions thereof. The processing device 130 may obtain the plurality of interest points corresponding to different portions of the device that are located within the field of view of the visual sensor from the plurality of reference points.

In 540, the processing device 130 (e.g., the acquisition module 410) may obtain image data collected by the visual sensor. In some embodiments, the image data may include an image representing at least a portion of the device. The image may be a two-dimensional (2D) image, a three-dimensional (3D) image, etc. The image data may include a representation of at least a portion of the plurality of interest points. The processing device 130 may obtain the image data from the visual sensor via the network 160 or the storage (e.g., the storage device 150, the storage 220). For example, the visual sensor may store the image data in the storage in advance. The processing device 130 may obtain the image data from the storage (e.g., the storage device 150, the storage 220).

In 550, the processing device 130 (e.g., the interest points matching module 420) may identify at least a portion of the plurality of interest points from the image data. As used herein, the identification of an interest point from the image data may refer to determine a point from the image data that represents a position on the device or a portion of the device where the interest point corresponds to. The point determined from the image data that represents the position on the device or the portion of the device where the interest point corresponds to may match with the interest point. The at least a portion of the plurality interest points identified from the image data may be also referred to as identified interest points (or matched interest points).

In some embodiments, the processing device 130 may identify the at least a portion of the plurality of interest points from the image data by matching the image data representing at least a portion of the device with the prior information (e.g., a CAD model) regarding the device. The processing device 130 may match the image data and the prior information using an image matching technique. Exemplary image matching techniques may include using a blocking matching algorithm (e.g., a mean absolute differences (MAD) algorithm, a sum of absolute differences (SAD) algorithm, etc.), a feature-based matching algorithm, etc. For example, using the feature-based matching algorithm, the processing device 130 may detect and/or extract a plurality of features points from the image data using a feature point extraction technique as described elsewhere in the present disclosure. Each of the plurality of feature points extracted from the image data may include one or more estimated feature descriptions. The one or more estimated feature descriptions of a feature point may be used to describe one or more features of the feature point, such as position, orientation, the distance between the feature point and another feature point or a reference point, etc., in the image data. In some embodiments, the one or more estimated feature descriptions may be denoted as an estimated feature vector. The processing device 130 may identify an interest point from the image data by matching the interest point with one of the plurality of feature points. As used herein; the match of an interest point with a feature point may refer to that the interest point and the feature point correspond to the same portion of the device. The processing device 130 may match the interest point with a feature point by matching the reference feature descriptions of the interest point and the estimated feature descriptions of the feature point. In some embodiments, the processing device 130 may determine whether the reference feature descriptions of the interest point match the estimated feature descriptions of the feature point by determining a similarity degree between the reference feature descriptions of the interest point and the estimated feature descriptions of the feature point. If the processing device 130 determines that the similarity degree between the reference feature descriptions of the interest point and the estimated feature descriptions of the feature point exceeds a threshold, the processing device 130 may determine that the reference feature descriptions of the interest point match the estimated feature descriptions of the feature point. If the processing device 130 determines that the reference feature descriptions of the interest point match the estimated feature descriptions of the feature point, the processing device 130 may determine that the interest point matches the feature point. The similarity degree between the reference feature descriptions of an interest point and the estimated feature descriptions of a feature point may be defined by a distance between the reference feature descriptions (i.e., the reference feature vector) of the interest point and the estimated feature descriptions (i.e., the estimated feature vector) of the feature point. Exemplary distances may include Euclidean distance, Manhattan distance, Canberra distance, etc.

In 560, the processing device 130 (e.g., the calibration module 430) determining a current transformation relationship between the first coordinate system and the second coordinate system based on the identified interest points.

The processing device 130 may determine the current transformation relationship based on information associated with the identified interest points in the image data (or the second coordinate system) and information associated with the identified interest points in the prior information (or the first coordinate system). For example, the processing device 130 may determine a location of each of at least a portion of the identified interest points in the second coordinate system applied to the image data or the visual sensor. The processing device 130 may determine a location of each of at least a portion of the identified interest points in the first coordinate system. The processing device 130 may determine the current transformation relationship based on the location of each of at least a portion of the identified interest points in the second coordinate system and the location of each of at least a portion of the identified interest points in the first coordinate system. The location of each of at least a portion of the identified interest points in the first coordinate system may be obtained from the prior information (e.g., the CAD model of the device). For example, the location of each of at least a portion of the identified interest points in the first coordinate system may be determined based on a transformation relationship between the first coordinate system and a third coordinate system of the prior information regarding the device. The transformation relationship between the first coordinate system and the third coordinate system of the prior information regarding the device may be a default setting of the calibration system 100.

In 570, a processing device same as or different from the processing device 130 (e.g., the positioning module 440) may determine, based on image data of a subject collected by the visual sensor, one or more characteristics of at least a portion of the subject in the first coordinate system using the transformation relationship. The one or more characteristics of at least a portion of the subject in the first coordinate system may include a spatial location, a size, a pose, a shape, etc., of the at least a portion of the subject.

For example, the processing device same as or different from the processing device 130 may obtain an image including the at least a portion of the subject captured by the visual sensor. The processing device may detect and/or identify the at least portion of the subject from the image. The processing device may determine a location of the at least a portion of the subject in the second coordinate system applied to the image. The processing device 130 may transform the location of the at least a portion of the subject in the second coordinate system into a spatial location of the at least a portion of the subject in the first coordinate system. Accordingly, the processing device may determine different locations of different portions of the subject in the first coordinate system. The processing device may determine the pose of the subject based on the different locations of different portions of the subject in the first coordinate system.

In some embodiments, the image data of the subject may be the same as the image data including the at least a portion of the device obtained in operation 540. For example, the image data of the subject and the image data including the at least a portion of the device may be the same image representing the at least a portion of the device and the at least a portion of the subject. In some embodiments, the image data of the subject may be different from the image data including the at least a portion of the device obtained in operation 540. For example, the image data of the subject may and the image data including the at least a portion of the device may be captured by the visual sensor at different times.

In some embodiments, the processing device 130 may determine current transformation relationships (i.e., second transform relationships) between the first coordinate system and third coordinate systems applied to additional visual sensors (i.e., second visual sensors) based on the prior information regarding the device according to operations 530-560. For example, the processing device 130 may obtain a plurality of second interest points from the feature library. The processing device 130 may obtain second image data of the device captured by each of the second sensors. The second image data of the device may include a representation of at least a portion of the device. The at least a portion of the device represented in the second image data may be same as or partially or entirely different from the at least portion of the device represented in the image data (i.e., first image data) of the device collected by the visual sensor (i.e., first visual sensor) as described in 540. The processing device 130 may identify at least a portion of the plurality of second interest points from the second image data. The processing device 130 may determine, based on identified second interest points, the second transformation relationship between the first coordinate system and a third coordinate system applied to the second visual sensor or the second image data; In some embodiments, the processing device 130 may obtain second image data of the subject captured by the second visual sensor. The second image data of the subject may represent at least a portion of the subject. The at least a portion of the subject represented in the second image data of the subject may be same as or partially or entirely different from the at least portion of the subject represented in the image data of the subject collected by the visual sensor (i.e., first visual sensor) as described in 570. The processing device 130 may determine one or more characteristics of the at least portion of the subject based on the second image data using the second transformation relationship.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 510-520 and/or 570 may be omitted from process 500.

Figure 6:
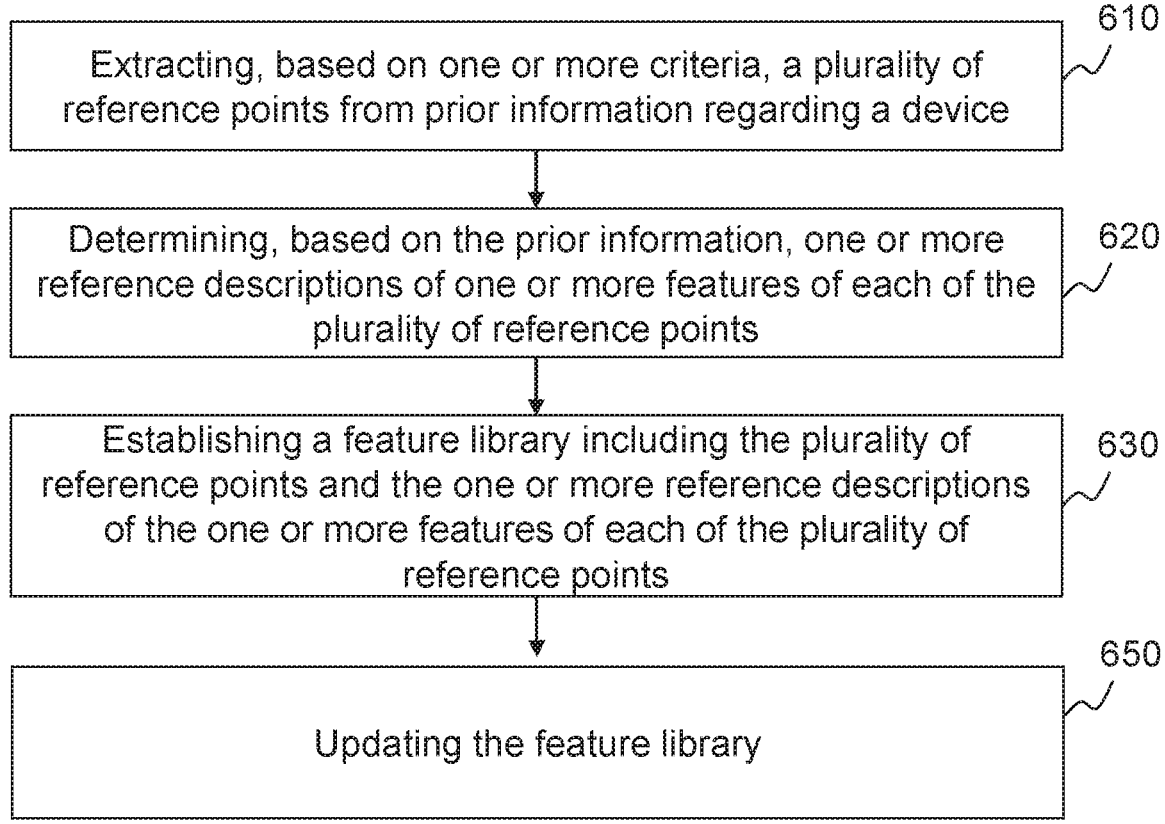
FIG. 6 is a flowchart illustrating an exemplary process of generating a feature library according to some embodiments of the present disclosure.

FIG. 6 is a flowchart illustrating an exemplary process of generating a feature library according to some embodiments of the present disclosure. Process 600 may be executed by the calibration system 100. For example, process 600 may be implemented as a set of instructions (e.g., an application) stored in a storage device in the processing device 130. The processing device 130 may execute the set of instructions and accordingly be directed to perform process 600 in the calibration system 100. The operations of the illustrated process 600 presented below are intended to be illustrative. In some embodiments, process 600 may be accomplished with one or more additional operations not described, and/or without one or more of the operations discussed. Additionally, the order in which the operations of process 600 as illustrated in FIG. 6 and described below is not intended to be limiting.

In 610, the processing device 130 (e.g., the interest points matching module 420 and/or the feature library determination module) may extract a plurality of reference points from prior information regarding a device based on one or more criteria. Each of the plurality of reference points may correspond to a portion of the device or a position on the device. The device may include a medical device (e.g.; the medical device 110) as described elsewhere in the present disclosure (e.g., FIG. 1 and the descriptions thereof).

A reference point may be also referred to as a feature point or a key point. The prior information regarding the device may be described as elsewhere in the present disclosure (e.g., FIG. 5 and the descriptions thereof). The processing device 130 may detect and/or extract the plurality of reference points using a feature point extraction technique as described elsewhere in the present disclosure (e.g., FIG. 5 and the descriptions thereof). Exemplary feature point extraction techniques may include using a local binary patterns (LBP) algorithm, a histogram of oriented gradient (HOG) algorithm, a Harris feature extraction algorithm, a scale-invariant feature transform (SIFT) algorithm, a smallest univalue segment assimilating nucleus (SUSAN) algorithm, a features from accelerated segment test (FAST) algorithm, a random sample consensus (RANSAC) algorithm, a binary robust independent elementary features (BRIEF) extraction algorithm, a speeded-up robust (SURF) algorithm, an oriented FAST and rotated BRIEF (ORB) algorithm, etc. Taking a CAD model of the device as an example, the plurality of reference points may be detected and/or extracted from one or more images representing the CAD model of the device. In some embodiments, the processing device 130 may obtain the one or more images by rendering the CAD model of the device using an image rendering technique. Exemplary image rendering techniques may include using a scanline rendering algorithm, a ray tracing algorithm, a luminous energy radiosity algorithm, etc.

The one or more criteria may include viewpoint invariant, rotation invariant, scale invariant, affine invariant, projected invariant, overall uniqueness, etc. Based on the one or more criteria, the plurality of reference points may be detected and/or extracted from the one or more images representing the CAD model of the device using the feature point extraction algorithm. For example, the SIFT algorithm may be used to detect and/or extract the plurality of reference points from the one or more images representing the CAD model of the device according to the scale invariant and the overall uniqueness. As another example, the Harris feature extraction algorithm may be used to detect and/or extract the plurality of reference points from the one or more images representing the CAD model of the device according to the rotation invariant. As still another example, the SUSAN algorithm may be used to detect and/or extract the plurality of reference points from the one or more images representing the CAD model of the device according to the scale invariant and the viewpoint invariant.

In 620, the processing device 130 (e.g., the interest points matching module 420 and/or the feature library determination module) may determine one or more reference feature descriptions of each of the plurality of reference points based on the prior information.

In some embodiments, each of the plurality of reference points may include one or more features. The one or more features may include position, orientation, the distance between a reference point and another reference point, etc. The one or more reference feature descriptions may be used to describe the one or more features of each of the plurality of reference points. The processing device 130 may determine the one or more reference feature descriptions of each of the plurality of reference points from the prior information based on the feature point extraction technique. For example, using the feature point extraction technique, the processing device 130 may use a feature description operator to generate the one or more reference feature descriptions. Different feature point extraction algorithms may correspond to different feature description operators. For example, the scale-invariant feature transform (SIFT) algorithm may use a SIFT operator to generate the one or more reference feature descriptions of a reference point. As another example, the histogram of oriented gradient (HOG) algorithm may use a HOG operator to generate the one or more reference feature descriptions of a reference point. The one or more reference feature descriptions may be denoted as a feature vector.

In 630, the processing device 130 (e.g., the interest points matching module 420 and/or the feature library determination module) may establish a feature library including the plurality of reference points and the one or more reference feature descriptions of each of the plurality of reference points.

Each of the plurality of reference points in the feature library may have the one or more reference feature descriptions. In some embodiments, the feature library may include a reference location of each of the plurality of reference points in the real world. The reference location of each of the plurality of reference points in the real world may be denoted by a coordinate system applied to the device (e.g., the first coordinate system of the device as described in FIG. 5). For example, the reference location of each of the plurality of reference points in the real world may be denoted as three-dimensional coordinates in the coordinate system applied to the device (e.g., the first coordinate system of the device as described in FIG. 5). A reference location of a reference point in the real world may be determined based on the prior information regarding the device (e.g., the engineering drawing of the device) as described elsewhere in the present disclosure (e.g., FIG. 5 and the descriptions thereof). The reference location of each of the plurality of reference points in the real world determined based on the prior information regarding the device may also be referred to as a prior location in the coordinate system of the device.

In some embodiments, the established feature library may be stored in the storage (e.g., the storage device 150, the storage 220, etc.). The processing device 130 may retrieve the feature library from the storage.

In 640, the processing device 130 (e.g., the interest points matching module 420 and/or the feature library determination module) may update the feature library. As used herein, the update of the feature library may include updating at least a portion of the plurality of reference points and/or reference feature descriptions thereof. In some embodiments, the processing device 130 may update the feature library from time to time, e.g., periodically or not. For example, the feature library may be updated automatically periodically, such as once every one or more days, a week, a month, etc. As another example, the feature library may be updated in response to receipt of a request for an update from a user inputted via, e.g., the terminal(s) 140, or an event identified.

In some embodiments, the processing device 130 may determine whether the feature library needs to be updated based on the detection of an event, e.g., by assessing whether a change has occurred in the device. For example, the processing device 130 may update the feature library in response to a determination that an actual setup (i.e., current setup) of the device deviates from the prior information regarding the device. In some embodiments, the actual setup (i.e., current setup) of the device deviating from the prior information regarding the device may include an actual location (i.e., current location) of at least a portion of the device deviates from a prior location (i.e., reference location) of the at least a portion of the device when the prior information regarding the device was obtained. In some embodiments, the actual setup of the device deviating from the prior information regarding the device may include that one or more components are removed from or added to the device. In some embodiments, the processing device 130 may determine whether the actual setup of the device deviates from the prior information regarding the device based on one or more reference points corresponding to one or more positions on the device. In some embodiments, the processing device 130 may obtain current locations (i.e., current locations) of the one or more reference points in the coordinate system of the device using a location sensor, a distance measurement equipment, etc. For example, the one or more reference points corresponding to one or more positions on the device may be marked on the device by an operator. The current locations of the one or more reference points may be detected using a position sensor, a distance measurement equipment, etc. The processing device 130 may obtain a prior location of a reference point in the coordinate system of the device from the prior information regarding the device. The processing device 130 may determine a deviation between a prior location of the reference point and a current location of the reference point. The processing device 130 may determine whether the actual setup of the device deviates from the prior information regarding the device by determining whether the deviation between the prior location of the reference point and the current location of the reference point exceeds a threshold. If the deviation between the prior location of the reference point and the current location of the reference point exceeds the threshold, the processing device 130 may determine that the actual setup of the device deviates from the prior information regarding the device. In some embodiments, if multiple deviations between the prior locations of the one or more reference points and the current locations of the one or more reference points both exceed the threshold, the processing device 130 may determine that the actual setup of the device deviates from the prior information regarding the device.

The processing device 130 (e.g., the interest points matching module 420 and/or the feature library determination module) may update the feature library according to the deviation between the actual setup of the device deviates from the prior information regarding the device. For example, the processing device 130 may determine a deviation between the prior location of a reference point and the current location of the reference point. The processing device 130 may update the meta-data (e.g., a spatial location, a part number, etc.) of the reference point in the prior information with respect to the reference point. As used herein, meta-data may be used to facilitate reference to or identification of a reference point, including its location, its identification, etc. For example, the processing device 130 may adjust and/or update the prior location of the reference point in the prior information (e.g., CAD model) according to the deviation according to the current location of the reference point. As another example, the processing device 130 may determine a component that is removed from or added to the device where the reference point is located. The processing device 130 may update a part number, an assembly number, etc., associated with the component corresponding to the reference point. The processing device 130 may update the one or more reference feature descriptions of the reference point by extracting one or more reference feature descriptions from the prior information (e.g., CAD model) including the reference point with the updated location. Accordingly, the processing device 130 may update the reference feature descriptions and the meta-data of the reference point whose actual location deviates from the prior location of the reference point in the coordinate system of the device.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operation 650 may be omitted. As another example, process 600 may further include determining whether the feature library needs to be updated. In operation 650, the processing device 120 may update the feature library in response to a determination that the feature library needs to be updated.

Figure 7:
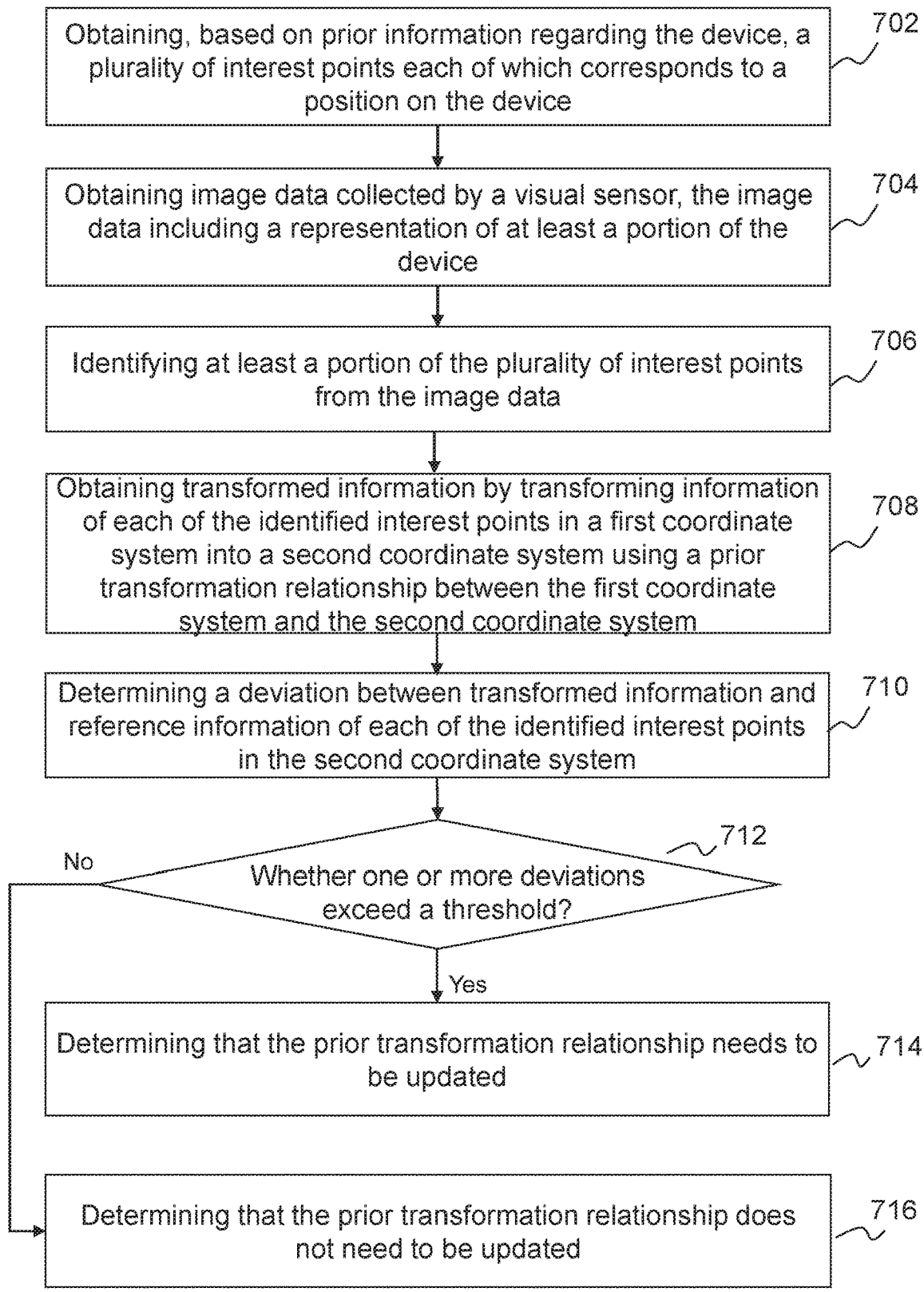
FIG. 7 is a flowchart illustrating an exemplary process of determining whether a calibration model needs to be updated according to some embodiments of the present disclosure.

FIG. 7 is a flowchart illustrating an exemplary process of determining whether a transformation relationship needs to be updated according to some embodiments of the present disclosure. The process 700 may be executed by the calibration system 100. For example, process 700 may be implemented as a set of instructions (e.g., an application) stored in a storage device in the processing device 130. The processing device 130 may execute the set of instructions and accordingly be directed to perform the process 700 in the calibration system 100. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. Operation 510 described in FIG. 5 may be performed according to process 700.

In 702, the processing device 130 (e.g., the acquisition module 410) may obtain, based on prior information regarding the device, a plurality of interest points each of which corresponds to a position on the device or a portion of the device. Operation 702 may be performed as similar to or same as operation 530 as described in FIG. 5.

In 704, the processing device 130 (e.g., the acquisition module 410) may obtain image data collected by the visual sensor. Operation 704 may be performed as similar to or same as operation 540 as described in FIG. 5.

In 706, the processing device 130 (e.g., the interest points matching module 420) may identify at least a portion of the plurality of interest points from the image data. Operation 706 may be performed as similar to or same as operation 550 as described in FIG. 5.

In 708, the processing device 130 (e.g., the calibration module 430 and/or the judgement module) may obtain transformed information by transforming information of each of the identified interest points in a first coordinate system into a second coordinate system using a prior transformation relationship between the first coordinate system and the second coordinate system. An interest point may correspond or represent a portion of the device or a position on the device.

The information of an identified interest point may include a location of the identified interest point (or a location of the portion of the device), a location relationship between the identified interest point and another point (or a location relationship between the portion of the device and another portion of the device), etc. For example, the first coordinate system may be applied to the image data and the second coordinate system may be applied to the device. The information of an identified interest point in the first coordinate system may include a location of an identified interest point (i.e., a portion of the device corresponding to the identified interest point) in the image data. The information of the identified interest point in the first coordinate system may be determined from the image data. As another example, the first coordinate system may be applied to the device and the second coordinate system may be applied to the image data collected by the visual sensor. The information of an identified interest point in the first coordinate system may include the location of the identified interest point (i.e., a portion of the device corresponding to the identified interest point) in the real world. The information of the identified interest point in the first coordinate system applied to the device may be obtained from the prior information regarding the device as described elsewhere in the present disclosure (e.g.; FIG. 5 and the descriptions thereof).

The information of an identified interest point in the second coordinate system may include the transformed information, also referred to as estimated information that is determined by converting the information of the identified interest point in the first coordinate system using the prior transformation relationship. The information of an identified interest point in the second coordinate system may also include reference information that is determined from the image data captured by the visual sensor or determined based on the prior information regarding the device. In some embodiments; the first coordinate system may be applied to the image data collected by the visual sensor and the second coordinate system may be applied to the device. The reference information of an identified interest point in the second coordinate system may include a reference location of the identified interest point (i.e., a portion of the device corresponding to the identified interest point) in the real world. In some embodiments, the first coordinate system may be applied to the device and the second coordinate system may be applied to the image data collected by the visual sensor. The information of an identified interest point in the second coordinate system may include a reference location of the identified interest point (i.e., a portion of the device corresponding to the identified interest point) in the image data.

In 710, the processing device 130 (e.g.; the calibration module 430 and/or the judgement module) may determine a deviation between the transformed information and reference information of each of the identified interest points in the second coordinate system.

In some embodiments, the first coordinate system may be applied to the device and the second coordinate system may be applied to the image data collected by the visual sensor or the visual sensor. The reference information of an identified interest point in the second coordinate system may include the reference location of a portion of the device in the image data. The transformed information of the identified interest point in the second coordinate system may include the transformed location of the portion of the device in the image data determined based on the location of the portion of the device in the real world using the prior transformation relationship.

In some embodiments, the first coordinate system may be applied to the visual sensor and the second coordinate system may be applied to the device. The reference information of an identified interest point in the second coordinate system may include the reference location of a portion of the device in the real world. The transformed information of the identified interest point in the second coordinate system may include the transformed location of the portion of the device in the real world determined, using the prior transformation relationship based on the location of the portion of the device in the image data that is determined based on the image data.

The processing device 130 may determine the deviation between the transformed information and the reference information of each of the identified interest points in the second coordinate system by determining a distance between the transformed information and the reference information of each of the identified interest points in the second coordinate system. For example, the processing device 130 may determine the deviation between the transformed information and the reference information of an identified interest point in the second coordinate system by determining a physical distance between the transformed location and the reference location in the second coordinate system.

In 712, the processing device 130 (e.g., the calibration module 430 and/or the judgement module) may determine whether one or more deviations between the transformed information and the reference information of one or more identified interest points in the second coordinate system exceed a threshold.

The threshold may be set by a user or according to a default setting of the calibration system 100, If the one or more deviations exceed the threshold, the processing device 130 may determine that the prior transformation relationship needs to be updated (i.e., the process 700 proceeds to operation 714), If the one or more deviations are less than the threshold, the processing device 130 may that the prior transformation relationship does not need to be updated (i.e., the process 700 proceeds to operation 716). In some embodiments, the processing device 130 may determine multiple deviations each of which is between the transformed information and the reference information of one of the identified interest points in the second coordinate system. If the processing device 130 determines that a specific count or number of deviations among the multiple deviations exceed the threshold, the processing device 130 may determine that the prior transformation relationship needs to be updated (i.e., the process 700 proceeds to operation 714). The specific count may exceed 1, or 2, or 3, etc.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. Operations 712-714 may be integrated into one single operation.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments; the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A system, comprising:
   at least one storage device storing executable instructions; and
   at least one processor and when executing the executable instructions, the at least one processor is configured to cause the system to perform operations including:
      obtaining, based on prior information regarding a device, a plurality of interest points, each of the plurality of interest points corresponding to a portion of the device, the prior information including one or more images including the device that provides one or more characteristics of each of a plurality of portions of the device in a first coordinate system applied to the device, and the plurality of interest points including feature points representing the plurality of portions of the device that are extracted from the one or more images of the device according to one or more criteria;
      obtaining image data of the device captured by a visual sensor, the image data of the device including a representation of at least a portion of the device;
      identifying at least a portion of the plurality of interest points from the image data of the device;
      determining, based on information of at least a portion of the identified interest points in the first coordinate system and in a second coordinate system that is applied to the visual sensor or the image data of the device, a transformation relationship between the first coordinate system and the second coordinate system, wherein to determine, based on information of at least a portion of the identified interest points in the first coordinate system and in a second coordinate system that is applied to the visual sensor or the image data of the device, a transformation relationship between the first coordinate system and the second coordinate system, the at least one processor is further configured to cause the system to perform the operations including:
         obtaining a determination result by determining whether a prior transformation relationship determined in a prior update needs to be updated; and
         determining, based on the determination result, the transformation relationship, wherein to obtain a determination result by determining whether a prior transformation relationship needs to be updated, the at least one processor is further configured to cause the system to perform the operations including:
            determining, based on at least a portion of the identified interest points, whether the prior transformation relationship needs to be updated, wherein to determine, based on at least a portion of the identified interest points, whether the prior transformation relationship needs to be updated, the at least one processor is further configured to cause the system to perform the operations including:
               determining a first location of each of the at least a portion of the identified interest points in the second coordinate system;
               obtaining a first transformed location in the first coordinate system by transforming the first location of each of the at least a portion of the identified interest points in the second coordinate system into the first coordinate system using a prior transformation relationship determined in a prior update; and
               determining whether the prior transformation relationship needs to be updated based on a comparison between a first reference location of each of the at least a portion of the identified interest points in the first coordinate system and the corresponding first transformed location; and
      determining, based on image data of a subject collected by the visual sensor, one or more characteristics of at least a portion of the subject in the first coordinate system using the transformation relationship, the device being configured to perform a medical procedure on the subject.

2. The system of claim 1, wherein the prior information regarding the device includes an engineering drawing of the device or a layout of a room where the device is located.

3. The system of claim 1, wherein to obtain, based on prior information regarding a device, a plurality of interest points, at least one processor is further configured to cause the system to perform the operations including:
   obtaining the plurality of interest points from a feature library constructed based on the prior information regarding the device.

4. The system of claim 3, wherein the feature library is constructed by a process including:
   selecting, based on one or more criteria, a plurality of reference points on the device from the prior information;
   determining, based on the prior information, one or more reference feature descriptions of one or more reference features of each of the plurality of reference points; and
   establishing the feature library including the plurality of reference points and the one or more reference feature descriptions of each of the plurality of reference points.

5. The system of claim 3, wherein before obtaining the plurality of interest points from the feature library, the at least one processor is further configured to cause the system to perform the operations including:
   determining whether an actual setup of the device deviates from the prior information regarding the device; and in response to a determination that the actual setup of the device deviates from the prior information regarding the device, updating the feature library.

6. The system of claim 3, wherein the at least one processor is further configured to cause the system to perform the operations including:
obtaining a plurality of second interest points from the feature library;
obtaining second image data captured by a second sensor, the second image data including a representation of at least a portion of the device;
identifying at least a portion of the plurality of second interest points from the second image data;
determining, based on identified second interest points, a second transformation relationship between the first coordinate system and a third coordinate system applied to the second visual sensor or the second image data; and
determining, based on second image data of the subject collected by the second visual sensor, one or more characteristics of at least a portion of the subject in the first coordinate system using the second transformation relationship.

7. The system of claim 1, wherein to identify at least a portion of the plurality of interest points from the image data, the at least one processor is further configured to cause the system to perform the operations including:
extracting a plurality of feature points from the image data, each of the plurality of extracted feature points including one or more estimated feature descriptions of the extracted feature point;
obtaining, based on the prior information, one or more reference feature descriptions of each of the plurality of interest points; and
determining the at least a portion of the plurality of interest points by matching, based on the one or more reference feature descriptions and the one or more estimated feature descriptions, each of the at least a portion of the plurality of interest points with one of the plurality of feature points.

8. The system of claim 1, wherein
the determination result includes that the prior transformation relationship does not need to be updated, and
the determining, based on the determination result, the transformation relationship includes designating the prior transformation relationship as the transformation relationship.

9. The system of claim 1, wherein
the determination result includes that the prior transformation relationship needs to be updated, and
the determining, based on the determination result, the transformation relationship includes generating, based on the information of the at least a portion of the identified interest points in the first coordinate system and the second coordinate system, the transformation relationship.

10. The system of claim 1, wherein to determine whether the prior transformation relationship needs to be updated based on a comparison between a reference location of each of at least a portion of the identified interest points in the first coordinate system and the first transformed location, the at least one processor is further configured to cause the system to perform the operations including:
determining a deviation between the first reference location and the first transformed location in the first coordinate system of each of the at least a portion of the identified interest points; and
determining that the prior transformation relationship needs to be updated in response to a determination that the deviation between the first reference location and the first transformed location of each of the at least a portion of the identified interest points exceeds a first threshold.

11. The system of claim 1, wherein to determine, based on information of at least a portion of the identified interest points in the first coordinate system and in a second coordinate system that is applied to the visual sensor or the image data of the device, a transformation relationship between the first coordinate system and the second coordinate system, the at least one processor is further configured to cause the system to perform the operations including:
determining a second location of each of the at least a portion of the identified interest points in the first coordinate system;
obtaining a second transformed location in the second coordinate system by transforming the second location of each of the at least a portion of the identified interest points in the first coordinate system into the second coordinate system using the prior transformation relationship;
determining whether the prior transformation relationship needs to be updated based on a comparison between a second reference location of each of the at least a portion of the identified interest points in the second coordinate system and the corresponding second transformed location; and
determining, based on a determination result of determining whether the prior transformation relationship needs to be updated, the transformation relationship.

12. The system of claim 1, wherein to determine whether the prior transformation relationship needs to be updated, the at least one processor is further configured to cause the system to perform the operations including:
determining, based on a deviation between a current position of the device and a prior position of the device when the prior update was performed or a deviation between a current position of the visual sensor and a prior position of the visual sensor when the prior update was performed, whether the prior transformation relationship needs to be updated.

13. A method, that is implemented on a computing device having at least one processor and at least one storage medium including a set of instructions, comprising:
obtaining, based on prior information regarding a device, a plurality of interest points, each of the plurality of interest points corresponding to a portion of the device, the prior information including one or more images including the device that provides one or more characteristics of each of a plurality of portions of the device in a first coordinate system applied to the device, and the plurality of interest points including feature points representing the plurality of portions of the device that are extracted from the one or more images of the device according to one or more criteria;
obtaining image data of the device captured by a visual sensor, the image data of the device including a representation of at least a portion of the device;
identifying at least a portion of the plurality of interest points from the image data of the device;
determining, based on information of at least a portion of the identified interest points in the first coordinate system and in a second coordinate system that is applied to the visual sensor or the image data of the device, a transformation relationship between the first coordinate system and the second coordinate system, wherein the determining, based on information of at least a portion of the identified interest points in the first coordinate system and in a second coordinate system that is applied to the visual sensor or the image data of the device, a transformation relationship between the first coordinate system and the second coordinate system includes:
obtaining a determination result by determining whether a prior transformation relationship determined in a prior update needs to be updated; and
determining, based on the determination result, the transformation relationship, wherein the obtaining a determination result by determining whether a prior transformation relationship needs to be updated includes:
determining, based on at least a portion of the identified interest points, whether the prior transformation relationship needs to be updated, wherein the determining, based on at least a portion of the identified interest points, whether the prior transformation relationship needs to be updated includes:
determining a first location of each of the at least a portion of the identified interest points in the second coordinate system;
obtaining a first transformed location in the first coordinate system by transforming the first location of each of the at least a portion of the identified interest points in the second coordinate system into the first coordinate system using a prior transformation relationship determined in a prior update; and
determining whether the prior transformation relationship needs to be updated based on a comparison between a first reference location of each of the at least a portion of the identified interest points in the first coordinate system and the corresponding first transformed location; and
determining, based on image data of a subject collected by the visual sensor, one or more characteristics of at least a portion of the subject in the first coordinate system using the transformation relationship, the device being configured to perform a medical procedure on the subject.

14. The method of claim 13, wherein the obtaining, based on prior information regarding a device, a plurality of interest points including:
obtaining the plurality of interest points from a feature library constructed based on the prior information regarding the device.

15. The method of claim 13, wherein the identifying at least a portion of the plurality of interest points from the image data including:
extracting a plurality of feature points from the image data, each of the plurality of extracted feature points including one or more estimated feature descriptions of the extracted feature point;
obtaining, based on the prior information, one or more reference feature descriptions of each of the plurality of interest points; and
determining the at least a portion of the plurality of interest points by matching, based on the one or more reference feature descriptions and the one or more estimated feature descriptions, each of the at least a portion of the plurality of interest points with one of the plurality of feature points.

16. A non-transitory computer-readable storage medium embodying a computer program product, the computer program product comprising instructions configured to cause a computing device to:
obtain, based on prior information regarding a device, a plurality of interest points, each of the plurality of interest points corresponding to a portion of the device, the prior information including one or more images including the device that provides one or more characteristics of each of a plurality of portions of the device in a first coordinate system applied to the device, and the plurality of interest points including feature points representing the plurality of portions of the device that are extracted from the one or more images of the device according to one or more criteria;
obtain image data of the device captured by a visual sensor, the image data of the device including a representation of at least a portion of the device;
identify at least a portion of the plurality of interest points from the image data of the device;
determine, based on information of at least a portion of the identified interest points in the first coordinate system and in a second coordinate system that is applied to the visual sensor or the image data of the device, a transformation relationship between the first coordinate system and the second coordinate system, wherein to determine, based on information of at least a portion of the identified interest points in the first coordinate system and in a second coordinate system that is applied to the visual sensor or the image data of the device, a transformation relationship between the first coordinate system and the second coordinate system, the computer program product comprising instructions configured to cause a computing device to:
obtain a determination result by determining whether a prior transformation relationship determined in a prior update needs to be updated; and
determine, based on the determination result, the transformation relationship, wherein to obtain a determination result by determining whether a prior transformation relationship needs to be updated, the computer program product comprising instructions configured to cause a computing device to:
determine, based on at least a portion of the identified interest points, whether the prior transformation relationship needs to be updated, wherein to determine, based on at least a portion of the identified interest points, whether the prior transformation relationship needs to be updated, the computer program product comprising instructions configured to cause a computing device to:
determine a first location of each of the at least a portion of the identified interest points in the second coordinate system;
obtain a first transformed location in the first coordinate system by transforming the first location of each of the at least a portion of the identified interest points in the second coordinate system into the first coordinate system using a prior transformation relationship determined in a prior update; and
determine whether the prior transformation relationship needs to be updated based on a comparison between a first reference location of each of the at least a portion of the identified interest points in the first coordinate system and the corresponding first transformed location; and determine, based on image data of a subject collected by the visual sensor, one or more characteristics of at least a portion of the subject in the first coordinate system using the transformation relationship.

\* \* \* \* \*